Feb. 3, 1959 M. TRIPOLI 2,872,202
UTILITY CART
Filed Jan. 14, 1957 4 Sheets-Sheet 1
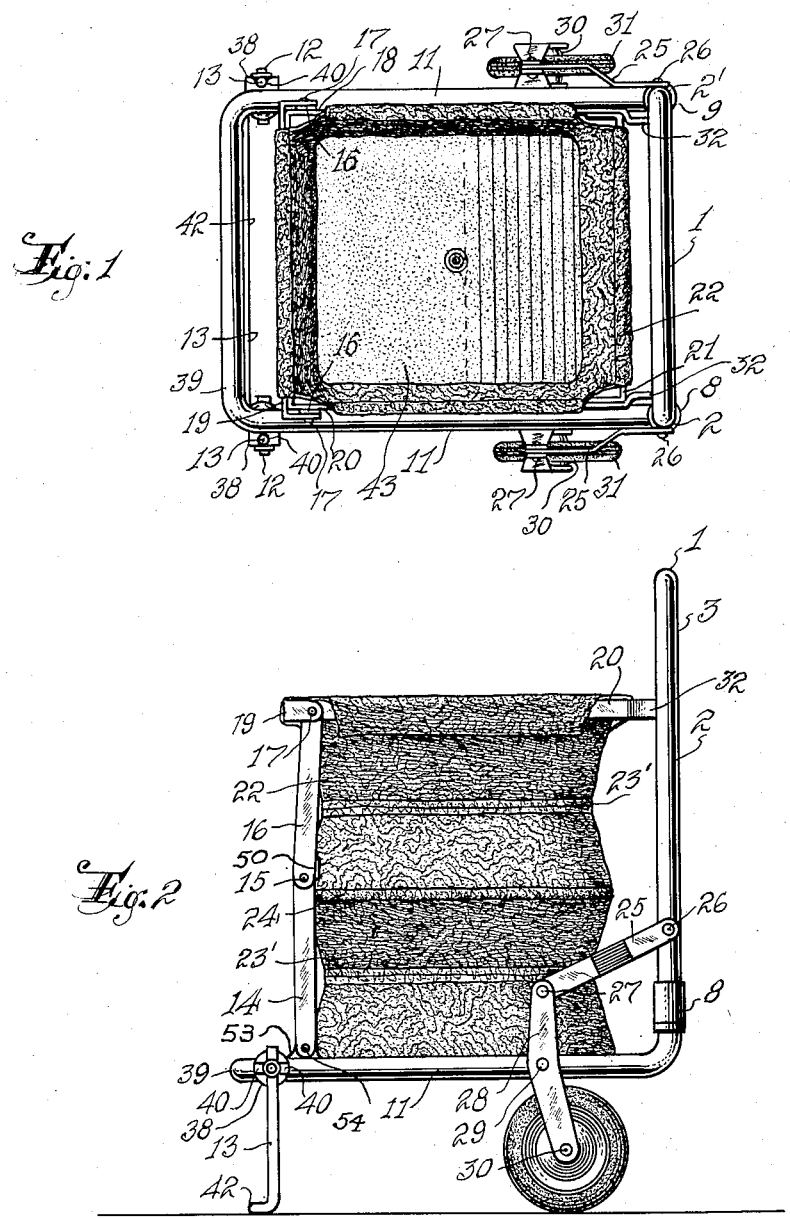

Feb. 3, 1959 M. TRIPOLI 2,872,202
UTILITY CART
Filed Jan. 14, 1957 4 Sheets-Sheet 2
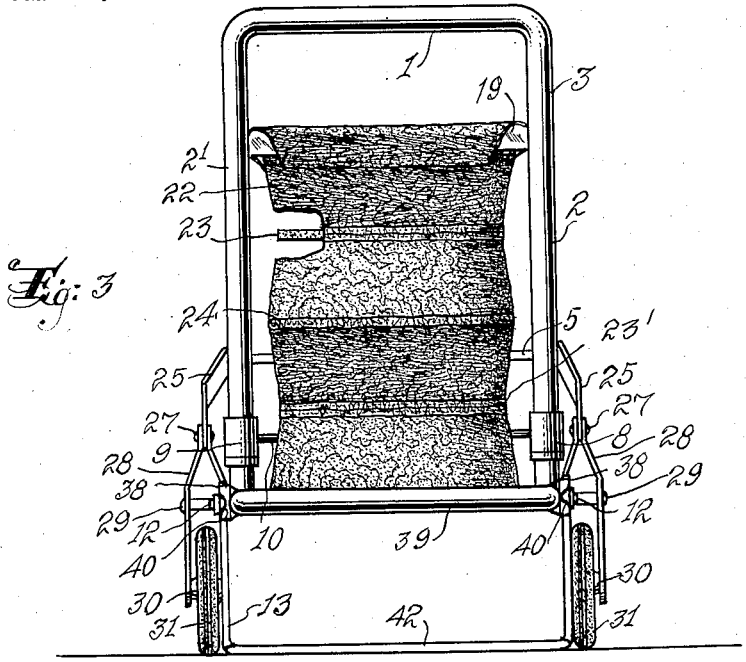
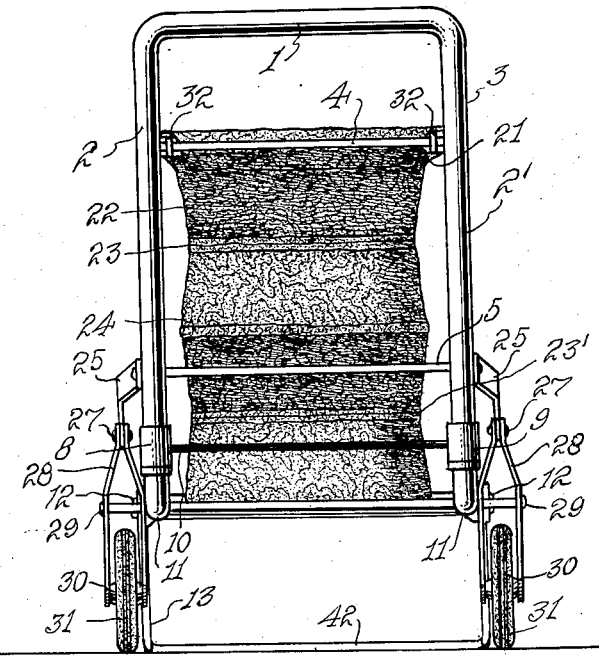
Inventor:
Marino Tripoli
By Peter J. Gaylor
Attorney Feb. 3, 1959   M. TRIPOLI   2,872,202
UTILITY CART
Filed Jan. 14, 1957   4 Sheets-Sheet 3

Inventor:
Marino Tripoli
By Peter J. Taylor
Attorney

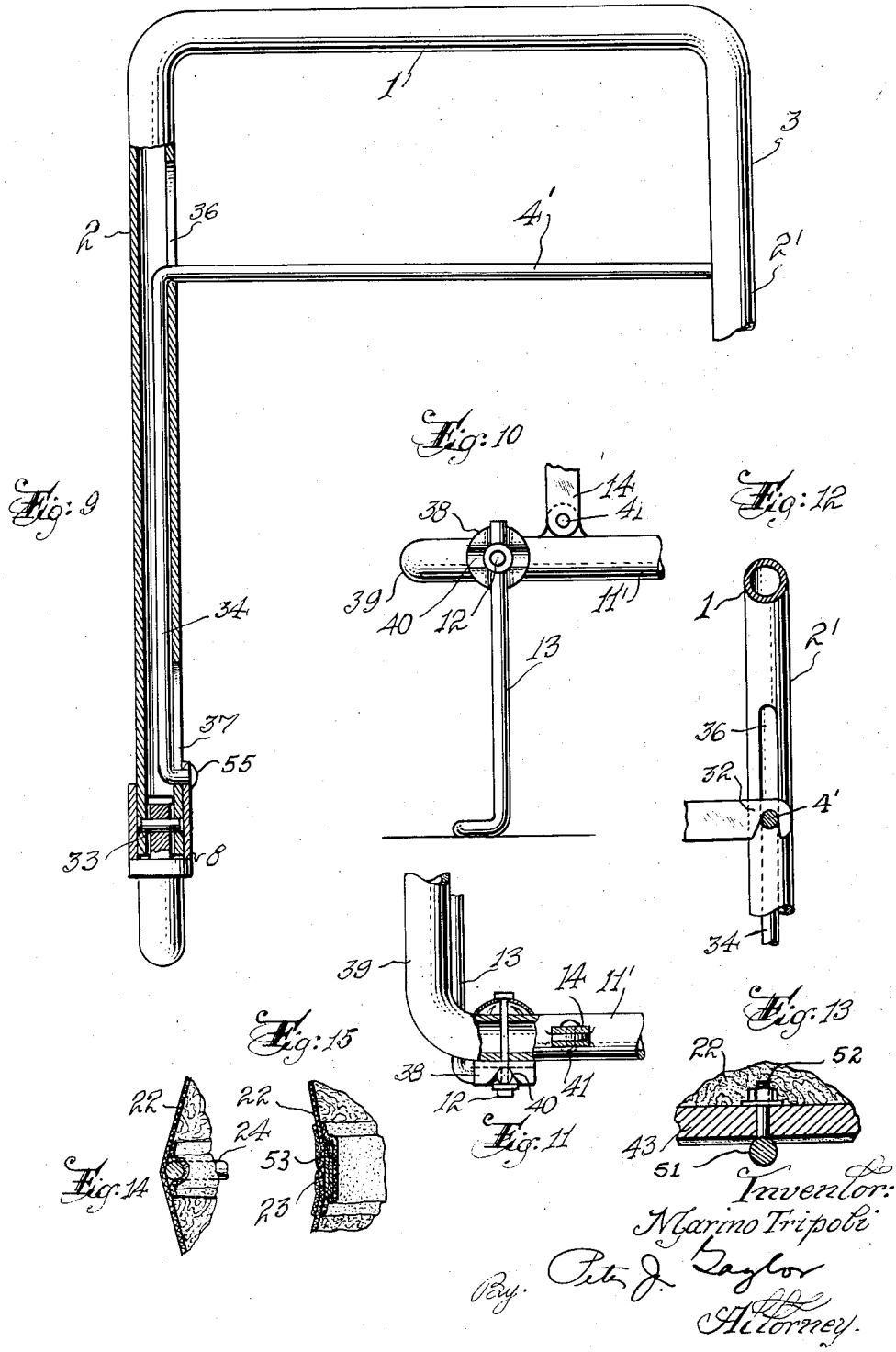

United States Patent Office 2,872,202
Patented Feb. 3, 1959

2,872,202

UTILITY CART

Marino Tripoli, Hillside, N. J.

Application January 14, 1957, Serial No. 633,873

4 Claims. (Cl. 280—36)

This invention deals with a utility hand cart adapted for transportation of groceries, laundry, and the like. More specifically, it relates to a foldable, two-wheeled hand cart employing a vertically-collapsible bag for holding the contents.

Hand carts made and sold in the past have involved numerous disadvantages. Most of those which have been adapted to be folded into more compact form, have been flimsy and have taken up too much space in folded condition. Such carts generally were folded with the hand frame held in vertical position. The container for holding the contents generally was of relatively heavy wire and was neither suitable for carrying small objects nor was adapted to fold compactly due to the nature of such wire side and front portions.

The cart of the present invention possesses many advantages and overcomes most of the disadvantages of prior art units. In the first place, the container portion is made of light fabric suitable for holding very small articles and is constructed to rapidly and compactly fold into a very small space over the base. Secondly, the hand frame is made to fold into horizontal position over the base with wheels retracting over the folded portion, thereby making a collapsed unit of small proportions involving no wheels or small parts to project out and catch on to particles or persons. Other features also are included and will be mentioned in detail in the forthcoming discussion.

Figure 7:
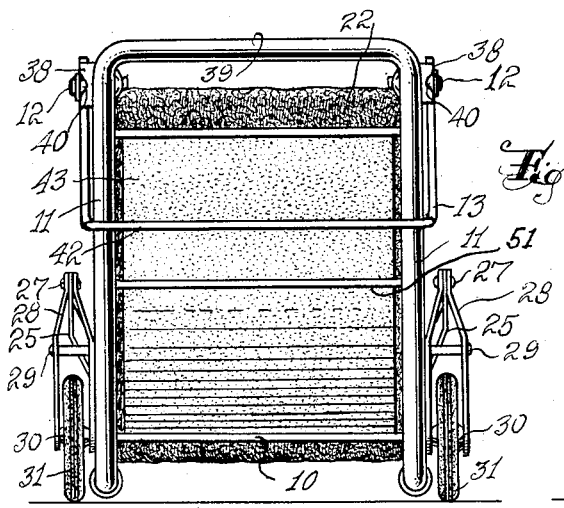
Figure 6:
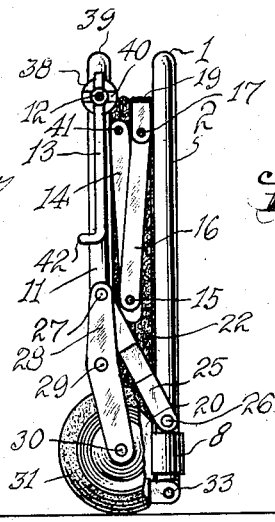
Figure 8:
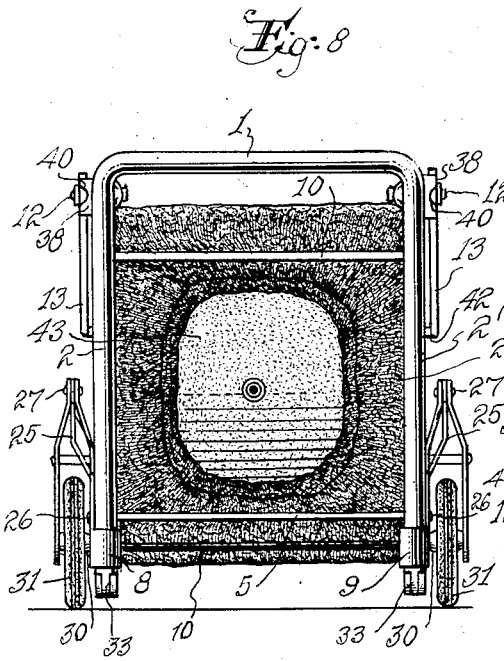
Figure 5:
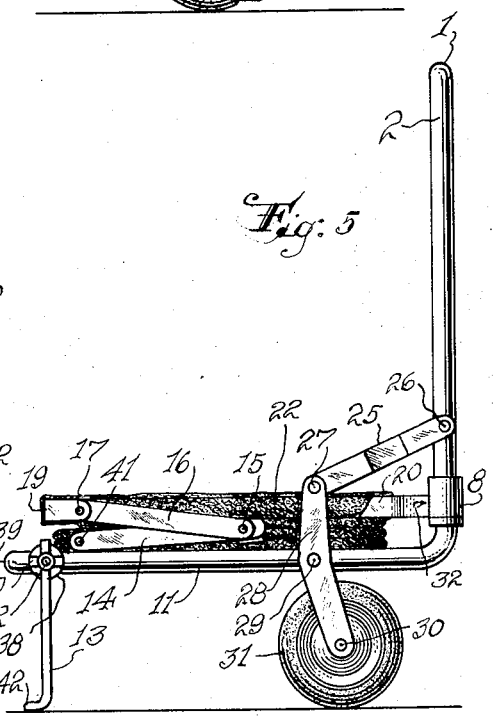

The invention will be more readily understood by reference to the accompanying drawings in which Figure 1 depicts a top or plan view of a preferred embodiment of a hand cart of the present invention, while Figure 2 illustrates a side view thereof. A front view of the same cart is shown in Figure 3 (with a portion of the container wall cut away to expose the constricting elastic band) and the rear view in Figure 4. Figure 5 presents a side view of the same cart with container in collapsed condition, while Figure 6 depicts a side view of the cart in completely folded condition. A bottom view of the same cart in completely folded condition is presented in Figure 7 and a top view thereof is illustrated in Figure 8. A rear view of another modification of the hand frame is shown in Figure 9. Figure 10 is a side view of the lower frame portion showing details in mounting the front frame support and fastening of the front container support. Figure 11 is a top view, partly in cross-section, of the portion shown in Figure 10. A side view of the hand frame and container rear engaging means of the unit depicted in Figure 9 is presented in Figure 12. Figure 13 shows a cross-sectional view of a portion of the container bottom illustrating the manner of attachment to the lower frame cross member. Figure 14 illustrates a fragmentary view, partly in cross-section, of the container wall as extended by rigid members and Figure 15 depicts a similar view of said wall as contracted by elastic members. Similar numerals refer to similar parts in the various figures.

Referring again to the drawings, numeral 1 represents the horizontal upper portion of the hand frame which is pushed or pulled by hand, while numerals 2 and 2' represent the vertical side members connected thereto. These two side members may be made of hollow metal tubing, and they are joined to the horizontal lower frame members 11 and 11', respectively, in hinging relation by means of hinged joints 33 (Fig. 6), which joints are locked in rigid relation (as in Figs. 1–4) by sleeves 8 and 9 which may be slipped thereover. These sleeves are joined by cross member 10 (Fig. 4) by the raising of which it is possible to expose hinged joints 33 to place them in foldable condition. Lower frame side members 11 and 11' are joined at the front by member 39. All of these frame elements preferably are made of hollow metal tubing.

Disposed near the rearward portion of each of the lower frame side members 11 and 11' is shaft 29 which penetrates both side members 11, 11' and serves as a pivot for angled wheel support 28 on the lower portion of which are the wheel-straddling bearing mountings for shaft 30 on which wheel 31 rotates. The upper portions of wheel support 28 are swivelly connected at 27 to the lower end of arm 25. The other end of arm 25 is swivelly connected also in hinging relation, to vertical hand frame member 2 or 2'. It is apparent from this construction that when hinges 33 are freed, as in Figures 6 and 8, sleeves 8 and 9 are in raised position and forward movement of frame members 2 and 2' will cause arms 25 to move wheels 31 rearwardly.

Container base 43 (which may be a rectangular or square sheet of plywood) may be centrally held on crosspiece 51 (Fig. 7) by bolt 52 attached thereto (Fig. 13). Container wall 22 which has its bottom edges fastened to the edges of base 43, may be made of any flexible or collapsible material, such as a coarsely woven plastic fabric. A rigid wire frame 24 of approximately the same size as base 43 is mounted in the middle portion of container wall 22 in a manner to hold the container fully open at that point. The upper edges of container wall 22 are attached to upper container frame member 19—20 by means of snap fasteners, by sewing or otherwise. This frame member 20 is provided with two rearwardly directed hook-shaped prongs 32 (as in Fig. 12) which are adapted to hook onto frame cross-piece 4 and thus hold upright the rear of container wall 22. Between wire frame 24 and base 43, there is sewed on to the fabric of container wall 22 a partially-stretched elastic band 23' in a plane parallel to that of wire frame 24. A similar elastic band is similarly sewed onto the fabric of container 22 roughly equidistantly between wire frame 24 and upper container frame 19—20. It will be apparent from Figures 2–4 that elastic bands 23 and 23' exert a contracting force upon the fabric of container wall 22, causing the accordion-like container to pull down toward the base into a position similar to that in Figure 5. However, by means of a little force, it is possible to raise container frame members 19—20 and hook members 32 onto cross member 4 as in Figure 4. The pulling effect of the elastic portions 23 and 23' thus keep hooks 32 securely in place on cross member 4.

Attached swivelly to the forward portions of side container top frame members 20 at 17 is one end of arm 16 which is hinged at the other end to one end of arm 14. The other end of arm 14 is swivelly attached at 54 to a boss 53 (Fig. 2) on the forward portion of lower frame side member 11. Arms 16 and 14 are arranged so that their forward movement will raise the front portion of container wall 22 (the rear portion of which already is suspended by hooks 32 on cross member 4). A stop 50 is provided on the side of the end of arm 14 to serve as a locking means and to prevent any further forward movement after hinge 15 has moved out a little past the line between pivots 17 and 54. Also, when supporting arms 14 and 16 are in supporting position, as in Figure 2, rightward movement at joint 15 of both pairs of arms on both sides will cause partial collapse of the front portion of container wall 22, requiring only the unhooking of prongs 32 from cross member 4 to cause container wall 22 to fold down as in Figure 5.

In order to park the cart upright on the floor, a front support 42 is provided. This has vertical legs 13 connected thereto, the ends of which are swivelly attached (Figs. 10–11) at pivot 12 to plate 38 fixed to the side of the forward end of bottom frame member 11. Plate 12 is provided with vertical and lateral indentations 40 serving as resilient stops for positioning legs 13. Accordingly, when the cart is to be folded up, it is possible to push legs 13 rearwardly out of the way. The only other operation required to fold the unit is the raising of cross member 10 which raises sleeves 8 and 9 and unlocks hinges 33, whereby hand frame members 1 and 2 can be pushed forwardly over container wall 22. When this is done, wheels 31 move rearwardly, thereby resulting in a very compact package as depicted in Figure 6.

To open the folded unit, it is merely necessary to raise hand frame 1 which automatically positions the wheels and enables sleeves 8 to drop over hinges 33, locking them. Then upper container frame 20 is raised and members 32 are hooked onto cross member 4. Arms 14—16 are snapped into place on both sides, and the cart is ready to be wheeled away. If it is to be parked, legs 13 may be pushed down by foot, and the cart is in position as in Figure 2.

Instead of using cross member 10 for unlocking hinges 33, it is possible to employ the system depicted in Figure 9. Cross member 4' is positioned below and near hand frame member 1. Its ends enter openings 36 in hollow hand frame side members 2, and they are joined to the vertical members 34 riding within tubings 2. Above sleeve 8' is an opening 37 in tubing wall 2 through which the lower end of sliding members 34 is attached at 55 to the upper portion of sleeve 8'. It is evident from the foregoing that a pull on cross member 4' will raise sleeve 8' and thus expose hinge 33, unlocking it. Hooks 32 may be attached to cross member 4' (Fig. 12) similarly to the manner depicted in Figure 4.

I claim:

1. In a foldable utility cart having a hand frame including a horizontal member for pushing said cart and a pair of vertical side members connected thereto, a lower frame for supporting the contents of the cart and including a horizontal front member connected to horizontal side members which are, in turn, connected to said vertical side members, and a pair of wheels supported by said horizontal side members, the improvement comprising hinging means serving as the connection for the side members of the hand frame and lower frame, lockable means for locking said hinging means in fixed position when the cart is to be used and unlocking them when it is to be folded, a rigid container bottom mounted between said horizontal side members, collapsible container walls having their lower edges attached to the edges of said bottom, a rigid frame attached to the upper edges of said container walls, engaging means attached to the rearward portion of said container frame, complementary engaging means on the upper portions of said vertical side members coacting with said container frame engaging means for holding up the rear portion of the container, a pair of vertically lockable hinged arms mounted on each side of said container and swivelly connected at the end of one hinged arm to the forward end of the horizontal side members and at the end of the other hinged arm to the forward portion of the container frame in a manner to hold said container open when in locked position and to permit collapsing of the container when in unlocked position, a rigid frame attached to the central portion of the container wall in a plane parallel to that of the bottom, and a partially-stretched elastic band similarly attached between said middle rigid frame and the top container frame and between the middle rigid frame and the bottom.

2. In a wheeled foldable utility cart having a hand frame including a horizontal member for pushing said cart and a pair of vertical side members connected thereto, a lower frame for supporting the contents of the cart and including a horizontal front member connected to horizontal side members which are, in turn, connected to said vertical side members, the improvement comprising hinging means serving as the connection for the side members of the hand frame and lower frame, lockable means for locking said hinging means in fixed position when the cart is to be used and unlocking them when it is to be folded, a wheel supporting arm swivelly mounted near its center to the rearward portion of each horizontal side member, a wheel mounted on the lower portion of each said supporting arm, and a thrust arm swivelly connected at one end to the upper end of each said supporting arm and on the other end to the lower portion of each said vertical side member above the hinging means in a manner enabling retraction of the wheel when said vertical side member is folded forwardly at said hinging means, a rigid container bottom mounted between said horizontal side members, collapsible container walls having their lower edges attached to the edges of said bottom, a rigid frame attached to the upper edges of said container walls, engaging means attached to the rearward portion of said container frame, complementary engaging means on the upper portions of said vertical side members coacting with said container frame engaging means for holding up the rear portion of the container, a pair of vertically lockable hinged arms mounted on each side of said container and swivelly connected at the end of one hinged arm to the forward end of the horizontal side members and at the end of the other hinged arm to the forward portion of the container frame in a manner to hold said container open when in unlocked position and to permit collapsing of the container when in unlocked position, a rigid frame attached to the central portion of the container wall in a plane parallel to that of the bottom, and a partially stretched elastic band similarly attached between said middle rigid frame and the top container frame and between the middle rigid frame and the bottom.

3. A wheeled foldable utility cart according to claim 2 in which the complementary engaging means is a cross member connected between said vertical side members.

4. A wheeled foldable utility cart according to claim 3 in which the latter cross member is connected to a sleeve adapted to slip over said hinging means and lock same.

References Cited in the file of this patent

UNITED STATES PATENTS

| | | |
|---|---|---|
| 1,035,976 | Kurz | Aug. 20, 1912 |
| 1,231,030 | Kelley | June 26, 1917 |
| 1,817,513 | Headley | Aug. 4, 1931 |
| 2,670,216 | Leonard | Feb. 23, 1954 |